US009580598B2

(12) United States Patent
Younes

(10) Patent No.: US 9,580,598 B2
(45) Date of Patent: Feb. 28, 2017

(54) POLYURETHANE COMPOSITES PRODUCED BY A VACUUM INFUSION PROCESS

(75) Inventor: Usama E. Younes, McMurray, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 13/071,810

(22) Filed: Mar. 25, 2011

(65) Prior Publication Data

US 2012/0245286 A1    Sep. 27, 2012

(51) Int. Cl.
| | |
|---|---|
| C08L 75/08 | (2006.01) |
| C08K 7/02 | (2006.01) |
| B29C 47/76 | (2006.01) |
| C08G 18/71 | (2006.01) |
| C08G 18/76 | (2006.01) |
| C08G 18/48 | (2006.01) |
| C08J 5/04 | (2006.01) |
| C08G 18/18 | (2006.01) |
| B29C 70/44 | (2006.01) |
| B29L 31/08 | (2006.01) |

(52) U.S. Cl.
CPC .............. *C08L 75/08* (2013.01); *B29C 70/44* (2013.01); *C08G 18/1875* (2013.01); *C08G 18/482* (2013.01); *C08G 18/715* (2013.01); *C08G 18/7664* (2013.01); *C08J 5/04* (2013.01); *B29L 2031/085* (2013.01); *C08J 2375/04* (2013.01); *Y02P 70/523* (2015.11)

(58) Field of Classification Search
None
See application file for complete search history.

(56) References Cited

U.S. PATENT DOCUMENTS

| | | | | |
|---|---|---|---|---|
| 3,520,750 | A | * 7/1970 | Li et al. | ................ B29C 43/305 156/199 |
| 5,002,830 | A | * 3/1991 | Gillis et al. | ................ 428/423.1 |
| 5,130,404 | A | * 7/1992 | Freeland | .......................... 528/52 |
| 5,614,575 | A | 3/1997 | Kotschwar | |
| 5,750,613 | A | 5/1998 | Blum et al. | |
| 5,973,099 | A | 10/1999 | Nodelman et al. | |
| 2003/0011094 | A1 | 1/2003 | Filsinger et al. | |
| 2005/0038222 | A1* | 2/2005 | Joshi et al. | ...................... 528/44 |
| 2005/0072522 | A1 | 4/2005 | Hayashi et al. | |
| 2007/0015842 | A1 | 1/2007 | Moerman et al. | |
| 2007/0160793 | A1 | 7/2007 | Cageao et al. | |
| 2007/0183888 | A1 | 8/2007 | Gunneskov et al. | |
| 2007/0222105 | A1* | 9/2007 | Brown | .......................... 264/211 |
| 2008/0220112 | A1 | 9/2008 | Waldrop et al. | |

(Continued)

FOREIGN PATENT DOCUMENTS

| | | |
|---|---|---|
| JP | 2003226861 A | 8/2003 |
| WO | 9811148 | 3/1998 |

(Continued)

*Primary Examiner* — Jeffrey Washville
(74) *Attorney, Agent, or Firm* — Donald R. Palladino

(57) ABSTRACT

A polyurethane-forming system having a viscosity at 25° C. of less than 600 mPas for at least 30 minutes, a gel time at ambient temperature of greater than 60 minutes and a water content of less than 0.06% by weight, based on total system weight, is used to produce composites by a vacuum infusion process. This system makes it possible to produce large composites such as wind turbine blades having excellent physical properties.

16 Claims, 1 Drawing Sheet

(56) References Cited

U.S. PATENT DOCUMENTS

| | | | |
|---|---|---|---|
| 2008/0237909 A1* | 10/2008 | Bech | 264/101 |
| 2009/0252921 A1* | 10/2009 | Bottler et al. | 428/116 |
| 2010/0062238 A1 | 3/2010 | Doyle et al. | |
| 2010/0255316 A1 | 10/2010 | Reese et al. | |
| 2012/0159785 A1* | 6/2012 | Pyles | B29C 33/3842 29/889.7 |

FOREIGN PATENT DOCUMENTS

| | | |
|---|---|---|
| WO | 0029459 | 5/2000 |
| WO | 2010114703 A1 | 10/2010 |

\* cited by examiner

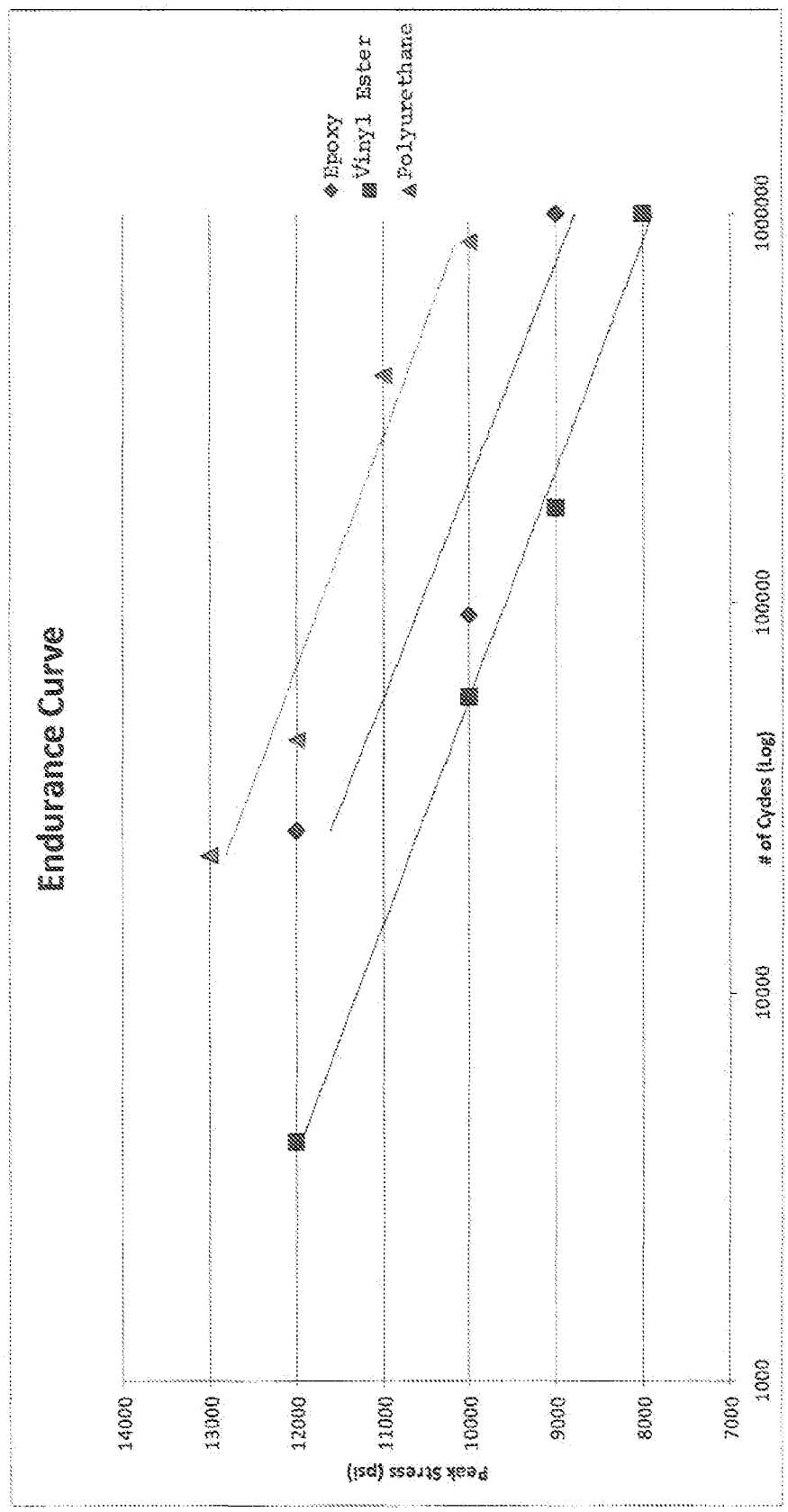

US 9,580,598 B2

POLYURETHANE COMPOSITES PRODUCED BY A VACUUM INFUSION PROCESS

BACKGROUND OF THE INVENTION

The present invention relates to a polyurethane-forming system for the production of reinforced polyurethane composites by a vacuum infusion process and to the composites produced from this system. The processing characteristics of this system and the physical properties of the composites produced from this system of the present invention are particularly advantageous for producing large articles. The composites of the present invention are particularly suitable for applications such as turbine wind blades.

Reinforced composites are being used for a number of applications where strength and light weight are important physical properties. Examples of applications for which reinforced composites are employed include automotive components and construction materials.

To date, the applications for which fiber reinforced composites have been used have been limited by the processability of the polymer-forming system and the properties of the polymeric material used to produce the composite. More specifically, production of larger composite articles requires a liquid reactive system having a viscosity that is low enough to thoroughly penetrate the reinforcing material and a reactivity slow enough that it will not set completely before the form or mold has been completely filled but not so slow that production of a single molded composite article will require such an extremely long period of time that it becomes uneconomical to produce a composite article with that material.

One method for increasing the speed with which a reactive system is introduced into the reinforcing material is a vacuum infusion molding process. In a vacuum infusion molding process, the reinforcing material is positioned within a vacuum chamber. The pressure within this vacuum chamber is then drawn down. The pressure differential, between the bag in which the pressure has been reduced and the atmospheric pressure on the reactive mixture to be fed into the bag pushes the reactive mixture into the bag and into the reinforcing material. This technique is not, however, without its problems. Localized areas of the composite produced may exhibit less than optimum physical properties due to poor fiber volume control, lower fiber volume and excess resin.

Attempts to resolve the problems encountered with the vacuum infusion process have included the use of a specially designed mold (U.S. 2008/0237909), use of a double vacuum chamber resin infusion device (U.S. 2008/0220112), use of multiple flow injection points, introduction of a thermoplastic material in two separate stages (U.S. 2010/0062238), and production of smaller segments of the desired article with subsequent joinder of those segments (U.S. 2007/0183888).

However, these techniques require specially designed equipment and/or multiple process steps.

To date, modification of the polymer-forming reaction mixture, especially a polyurethane-forming reaction mixture has not been an approach that has been successfully implemented in a vacuum infusion process for producing large composite articles such as wind turbines.

It would, therefore, be advantageous to develop a polyurethane-forming system having a viscosity that is sufficiently low that it can be successfully infused into a reinforcing material before the polyurethane-forming reaction has been completed and a reactivity that is not so slow that production of the composite becomes economically impractical.

SUMMARY OF THE INVENTION

It is an object of the present invention to provide a polyurethane-forming system for the production of large composite articles.

It is also an object of the present invention to provide a polyurethane-forming system that can be effectively infused into a reinforcing material by a vacuum infusion process.

It is a further object of the present invention to provide a composite article produced with the polyurethane-forming system of the present invention.

It is another object of the present invention to provide a polyurethane-forming system for the production of a composite wind turbine blade.

It is also an object of the present invention to provide a process for vacuum infusion of a reinforcing material with the polyurethane-forming system of the present invention.

It is an additional object of the present invention to provide composites produced by a vacuum infusion process that have sufficient green strength to be de-molded in 6 hours or less.

These and other objects which will be apparent to those skilled in the art are accomplished with the polyurethane-forming system having a viscosity at 25° C. of less than 600 mPas for at least 30 minutes, a gel time of greater than 60 minutes and a water content of less than 0.06% by weight that is described more fully below.

BRIEF DESCRIPTION OF THE FIGURE

The FIGURE graphically illustrates the tensile fatigue data for composite panels produced from the polyurethane-forming system of Example 2, an epoxy resin and a vinyl ester resin.

DETAILED DESCRIPTION OF THE PRESENT INVENTION

The present invention is directed to a polyurethane-forming system having a viscosity at 25° C. of less than 600 mPas for at least 30 minutes, preferably less than 400 mPas, most preferably, from 250 to 300 mPas, a gel time of greater than 60 minutes, preferably, greater than 180 minutes and a water content of less than 0.06% by weight, based on the total weight of the polyurethane-forming system.

The system of the present invention includes an isocyanate component and an isocyanate-reactive component.

The isocyanate component of the system of the present invention must have a viscosity at 25° C. of from about 20 to about 300 mPas, preferably, from about 20 to about 300 mPas, more preferably, less than 100 mPas, most preferably, from about 40 to about 80 mPas. This isocyanate component includes at least one diisocyanate or polyisocyanate.

The isocyanate-reactive component of the system of the present invention includes: (i) one or more polyols having a viscosity(ies) at 25° C. of from 20 to 850 mPas, preferably, from about 30 to about 750 mPas, more preferably, from about 40 to about 700 mPas, most preferably, from about 50 to about 650 mPas, and an OH number of from about 200 to about 800 mg KOH/g, preferably, from about 300 to about 700 mg KOH/g, more preferably, from about 400 to about 600, most preferably, from about 350 to about 520 mg KOH/g; (ii) up to about 6% by weight, based on total isocyanate-reactive component, preferably, up to about 4% by weight, most preferably, up to about 3% by weight, of a flow additive, and (iii) from about 2 to about 6% by weight, based on total isocyanate-reactive component, preferably, from about 2 to about 4% by weight, most preferably, from about 2 to about 3% by weight of a drying agent, with the sum of the weight percents for all of the components of the isocyanate-reactive component being equal to 100% by weight.

The isocyanate-reactive component of the present invention will generally have an average functionality of from about 2 to about 6, preferably, from about 2 to about 4, most preferably, from about 2 to about 3.

Optionally, up to 1% by weight of additives which do not cause foaming may also be included in the system of the present invention, preferably, in the isocyanate-reactive component.

The isocyanate component and the isocyanate-reactive component are reacted in amounts such that the NCO Index (i.e., the ratio of the total number of reactive isocyanate groups present to the total number of isocyanate-reactive groups that can react with the isocyanate under the conditions employed in the process multiplied by 100) is from 99 to 110, preferably from about 100 to about 105, most preferably, about 102.

Any of the known diisocyanates or polyisocyanates having a viscosity no greater than 300 mPas at 25° C. or which when combined with other diisocyanates or polyisocyanates will result in an average viscosity no greater than 300 mPas at 25° C. may be included in the polyisocyanate component of the system of the present invention. It is preferred, however, that only one diisocyanate or polyisocyanate be included in the isocyanate component of the present invention. Diphenylmethane diisocyanate (MDI) and polymeric MDI are particularly preferred. An Example of a particularly preferred polyisocyanate is that which is commercially available from Bayer MaterialScience LLC under the names Mondur CD, Mondur MRS-4 and Mondur MRS-5.

Any of the known polyols having a viscosity at 25° C. of less than 850 mPas and an OH number of from about 200 to about 800 would be a suitable polyol component of the system of the present invention. Suitable polyols include polyether polyols and polyester polyols. Preferred polyols are polyether polyols having a viscosity at 25° C. of less than 850 mPas and an OH number of from about 200 to about 800. Examples of the preferred polyols are those polyether polyols which are commercially available under the names Multranol 9168, Multranol 9138, Multranol 4012, Multranol, 4035, Multranol 9158, Multranol 9198, Multranol 9170, Arcol PPG425, Arcol 700, and Arcol LHT 240.

Any of the known flow additives may be included in the isocyanate-reactive component of the system of the present invention. Examples of preferred flow additives include those which are commercially available under the names Byk 1790, Byk 9076, Foamex N, BYK A530, BYK 515, BYK-A 560, BYK C-8000, BYK 054, BYK 067A, BYK 088 and Momentive L1920.

Any of the known drying agents may be included in the isocyanate-reactive component of the system of the present invention. Examples of suitable drying agents include: that which is commercially available under the name Incozol, p-toluenesulfonyl isocyanate available from the OMG Group, powdered sieves, and calcium hydride.

The reaction mixture may optionally contain a catalyst for one or more of the polymer forming reactions of polyisocyanates. Catalyst(s), where used, is/are preferably introduced into the reaction mixture by pre-mixing with the isocyanate-reactive component. Catalysts for the polymer forming reactions of organic polyisocyanates are well known to those skilled in the art. Preferred catalysts include, but are not limited to, tertiary amines, tertiary amine acid salts, organic metal salts, covalently bound organometallic compounds, and combinations thereof. The levels of the preferred catalysts required to achieve the needed reactivity profile will vary with the composition of the formulation and must be optimized for each reaction system (formulation). Such optimization would be well understood by persons of ordinary skill in the art. The catalysts preferably have at least some degree of solubility in the isocyanate-reactive component used, and are most preferably fully soluble in that component at the use levels required.

The inventive formulation may contain other optional additives, if desired. Examples of additional optional additives include particulate or short fiber fillers, internal mold release agents, fire retardants, smoke suppressants, dyes, pigments, antistatic agents, antioxidants, UV stabilizers, minor amounts of viscosity reducing inert diluents, combinations of these, and any other known additives from the art. In some embodiments of the present invention, the additives or portions thereof may be provided to the fibers, such as by coating the fibers with the additive.

Other optional additives include moisture scavengers, such as molecular sieves; defoamers, such as polydimethylsiloxanes; coupling agents, such as the mono-oxirane or organo-amine functional trialkoxysilanes; combinations of these and the like. Fire retardants are sometimes desirable as additives in composites. Examples of preferred fire retardant types include, but are not limited to, triaryl phosphates; trialkyl phosphates, especially those bearing halogens; melamine (as filler); melamine resins (in minor amounts); halogenated paraffins and combinations thereof.

The present invention also relates to reinforced composites produced with the system of the present invention. These reinforced composites are produced by infusing the system of the present invention into a reinforcing material and subsequently curing the infused reinforced material.

Reinforcing materials suitable for the production of such composites include: any fibrous material or materials that can provide long fibers capable of being at least partially wetted by the polyurethane formulation during impregnation. The fibrous reinforcing material may be single strands, braided strands, woven or non-woven mat structures and combinations thereof. Mats or veils made of long fibers may be used, in single ply or multi-ply structures. Suitable fibrous materials are known. Examples of suitable fibrous materials include: glass fibers, glass mats, carbon fibers, polyester fibers, natural fibers, aramid fibers, nylon fibers, basalt fibers, and combinations thereof. Particularly preferred in the present invention are long glass fibers. The reinforcing fibers may optionally be pre-treated with sizing agents or adhesion promoters known to those skilled in the art.

The weight percentage of the long fiber reinforcement in the composites of the present invention may vary considerably, depending on the fiber type used and on the end use application intended for the composite articles. Reinforcement loadings may be from 30 to 80% by weight of glass, preferably from 40 to 75% by weight of the final composite, more preferably from 50 to 72% by weight, and most preferably from 55 to 70% by weight, based on the weight of the final composite. The long fiber reinforcement may be present in the composites of the present invention in an amount ranging between any combination of these values, inclusive of the recited values.

The composites of the present invention, are characterized by fatigue tensile strengths (determined in accordance with ASTM E647-05) that are at least twice the fatigue tensile strengths of reinforced epoxy composites. The composites of the present invention also have inter-laminar fracture toughness values (determined in accordance with ASTM D5528) that is at least double the inter-laminar toughness of a fiber-reinforced epoxy composite. These characteristics make the composites of the present invention particularly useful for applications such as wind turbine blades.

The composites of the present invention are preferably made by a vacuum infusion process. Vacuum infusion processes are known to those skilled in the art.

More specifically, in producing a composite with the system of the present invention by vacuum infusion, the isocyanate and isocyanate-reactive components are de-gassed and combined to form the reaction mixture. The reinforcing material is placed in a vacuum chamber (typically, one or more bags). The pressure within this vacuum chamber is then drawn down. The pressure differential between the vacuum chamber in which the pressure has been reduced and the atmospheric pressure on the reaction mixture pushes the reaction mixture into the vacuum chamber and into the reinforcing material. The reaction mixture is cured and the composite thus formed is removed from the vacuum chamber.

A more detailed description of a vacuum infusion process can be found in Published U.S. Patent Applications 2008/0220112 and 2008/0237909.

Having thus described the invention, the following Examples are given as being illustrative thereof. All parts and percentages reported in these Examples are parts by weight or percentages by weight, unless otherwise indicated.

EXAMPLES

The materials used in the Examples which follow were:
POLYOL A: A polyether polyol having a viscosity at 25° C. of approximately 315 mPas, a functionality of 3 and an OH number of approximately 350 mg KOH/g which is commercially available from Bayer MaterialScience LLC under the name Multranol 9170.
POLYOL B: A polypropylene oxide-based diol having a viscosity at 25° C. of approximately 73 mPas and an OH number of approximately 263 mg KOH/g which is commercially available from Bayer MaterialScience LLC under the name Arcol PPG 425.
POLYOL C: A polyether polyol having a viscosity at 25° C. of approximately 650 mPas, a functionality of 3 and an OH number of approximately 370 mg KOH/g which is commercially available from Bayer MaterialScience LLC under the name Multranol 4012.
POLYOL D: polypropylene oxide-based diol having a viscosity at 25° C. of approximately 55 mPas and an OH number of approximately 515 mg KOH/g which is commercially available from Bayer MaterialScience LLC under the name Multranol 9198.
POLYOL E: A polyether polyol having a viscosity at 25° C. of approximately 450 mPas, a functionality of 3 and an OH number of approximately 470 mg KOH/g which is commercially available from Bayer MaterialScience LLC under the name Multranol 9158.
DRYING AGENT A: Incozol 2 which is commercially available from Incozel Inc.
DRYING AGENT B: Zeolite powder which is commercially available under the name Baylith.
DRYING AGENT C: P-toluenesulfonyl isocyanate which is commercially available from the OMG Group.
CATALYST A: Delayed action amine catalyst which is commercially available from Momentive under the name Niax A577.
CATALYST B: Delayed action amine catalyst which is commercially available from: Momentive under the name Niax A575.
FLOW ADDITIVE A: Silicone-free material commercially available from BYK under the designation BYK-A 560.
FLOW ADDITIVE B: Silicone-free material, commercially available from BYK under the designation BYK-A 1790.
ISOCYANATE A: Polymeric MDI having a viscosity at 25° C. of 40 mPas which is commercially available from Bayer MaterialScience LLC under the name Mondur CD.
ISOCYANATE B: Polymeric MDI having a viscosity at 25° C. of 40 mPas which is commercially available from Bayer MaterialScience LLC under the name Mondur MRS-4.
ISOCYANATE C: Polymeric MDI having a viscosity at 25° C. of 40 mPas which is commercially available from Bayer MaterialScience LLC under the name Mondur MRS-5.

General Procedure Used to Produce Panels for Testing in the Examples

Panels measuring 24 inches (61 cm) by 24 inches (61 cm) were produced from the above-listed materials in the combination(s) indicated in the following Table and a fiberglass mat by a vacuum assisted resin transfer molding (RTM) process. The panels were made by perimeter infusion pulling vacuum from the center. After the glass surface on a table was thoroughly cleaned, sealant tape was applied to the complete border of the surface glass for the outside bag, while the inner border of tape outlined the fiberglass mats being used. A mold release agent was applied to the inside area of tape twice with excess mold release agent being wiped between the borders of tape. After the mold release agent was buffed on the table and air dried, the fiberglass mat was placed inside the border.

After spiral-cut polyethylene tubing was heated to remove unwanted curls, a t-joint was connected on one end of the tubing. The tubing was then placed around entire perimeter of the fiberglass mat with small half inch pieces of the same sealant tape to make a border and eventually connect the tubing to the other end of the t-joint. A sheet of polyethylene, used as a release film, was cut out to fit inside the border of the resin release tubing with a half inch (1.27 cm) square cut in the center of the sheet. A small rectangle of breather cloth was cut and placed under the resin connecter in the middle of the fiberglass mat. The piece of cloth covered the square and reached a few inches so that when the resin connector was a little off center, any resin reaching the center would not get pulled up the tube too fast and cause bubbling in the part being produced.

The first vacuum bag was then cut. Sealant tape was placed on the rim of the resin connecter and around the base of the t-joint. The vacuum bag was placed over the entire mat with an inch or two of excess on all sides of the first border of sealant tape. A hole was poked for the t-joint to come through and a circle was cut out so that the resin connecter could come through as well. The vacuum bag was stuck down side by side to the sealant tape using pleats where necessary to keep the bag as flat and wrinkle-free as possible over the part.

After the inside bag is completely sealed off, the outside vacuum bag was cut from the roll. The same procedure was repeated to poke a hole for the t-joint and cut a hole for the resin connecter in the outside vacuum bag after that vacuum bag was placed over entire panel. Sealant tape was again placed on the rims of the t-joint and resin connecter. The vacuum bag was stuck to both of those pieces and once again began to be sealed off side by side using pleats where needed leaving one side open where the outside bag vacuum tube would be inserted.

Breather cloth and pressure sensitive tape were placed on the end of vacuum tube and sealant tape was then wrapped around the area that would touch the border of the sealant tape (about four (10.2 cm) to five inches (12.7 cm) inside of the panel).

After the outside vacuum line was in place, the last side could be sealed off. The previously heated polyethylene tubing was then cut to the appropriate size so that the tube was running out of the center resin connecter which connected to another t-joint used to connect the main vacuum line to the other outside tube for the secondary bag.

Another tube was then cut and used to connect the infusion t-joint to the empty resin jar. That line was clamped to seal off the entire panel. The vacuum was then turned on and allowed to pull all air out of part. The vacuum pulled while eliminating as many wrinkles over part as possible. After no leaks could be heard, a vacuum leak detector was used to check for micro leaks around the entire panel. After all leaks had been located and eliminated, the part was ready to be infused.

The amounts of polyol and isocyanate indicated in Table 1 were measured and mixed for 30 seconds to a minute. The resin tube was then placed through a hole in the resin jar lid and the resin jar was screwed to the lid while the tube was still clamped. Once the resin jar was in place and below the panel resting on a bucket or stool, the clamp was let go. The line was completely open. The resin jar must be placed below the infusion surface to control resin flow pressure to help control the resin flow speed. The part began to fill from the perimeter. Flow progress was traced and the time recorded while infusing. After the part had either filled completely or was no longer moving, the primary vacuum line in the center was clamped off (usually after from an hour to two hours, depending on complexity of fiberglass). The resin line was then clamped and finally the line straight from the vacuum was clamped to close the entire system off.

The tube leading to the vacuum was then cut below the clamped off part and the end was plugged with sealant tape. This tube was then slit below the resin line clamp to allow the resin to drain from the tube. The tube was then cut above that slit and plugged with sealant tape to keep the part from leaking. The part was thus infused and could be left to cure at room temp or put in an oven to increase the curing time.

TABLE 1

| | Example | | |
|---|---|---|---|
| | 1 | 2 | 3 |
| POLYOL(S) | A (750 g) & B (250 g) | C (800 g) & D (200 g) | E (800 g) & D (200 g) |
| DRYING AGENT | A (10 g) | B (30 g) | C (2 g) |
| CATALYST | A (0.3 g) | B (0.6 g) | A (0.4 g) |
| FLOW ADDITIVE | A (20 g) | A (30 g) | B (20 g) |
| POLYISOCYANATE | A (840 g) | B (950 g) | C (1140 g) |

Composites were produced using 6 panels of Vector Ply E-BX-2400, 800 g/m, +/−45 E-glass biax fabric with the polyurethane-forming composition of Example 2, and with commercially available epoxy and vinyl ester resins for comparison. The epoxy resin used was EpiKote 135i mixed with curative Hexion EpiCure 1366 which is commercially available from Hexion. The vinyl ester resin used was DION® IMPACT 9102-75 which is commercially available from Reichhold. The endurance characteristics of these panels were then compared. This comparison is graphically illustrated in the FIGURE.

It is readily apparent from the FIGURE that the tensile fatigue of the composite produced in accordance with the present invention was superior to that of the panels produced with the known epoxy or vinyl ester resins.

G1C Interlaminar fracture toughness tests were conducted in accordance with ASTM D5528 on the composite panels of Vector Ply E-BX-2400, 800 g/m, +/−45 E-glass biax fabric with the polyurethane-forming composition of Example 2, and with commercially available epoxy and vinyl ester resins for comparison. The epoxy resin used was EpiKote 135i mixed with curative Hexion EpiCure 1366 which is commercially available from Hexion. The vinyl ester resin used was that sold under the name DION® IMPACT 9102-75 which is commercially available from Reichhold. The results of these toughness tests are presented in Table 2. It is apparent from the results presented in Table 2 that the polyurethane system of the present invention was at least twice as tough as the panels made with the epoxy and vinyl resins.

TABLE 2

| ASTM D5528 | Epoxy | Vinyl | Resin from Example 2 |
|---|---|---|---|
| Stable delamination G1C (J/m$^2$) | 1918 | 1377 | 3798 |
| Standard Deviation | 507 | 212 | 728 |

A key feature of the compositions of the present invention is the ability of the polyurethane-forming system to stay liquid at low viscosity for long periods of time (i.e., at least 30 minutes, preferably, at least 40 minutes, most preferably, at least 50 minutes) at ambient temperatures to allow for infusion of large parts.

TABLE 3 compares the rise in viscosity over time of a typical commercially available polyurethane-forming system (Baydur RTM 902 which is commercially available from BMS LLC) with the polyurethane forming system of the present invention of Example 2.

TABLE 3

| Time (min)/Viscosity | Baydur RTM 902 | Invention |
|---|---|---|
| 0 | 600 mPas | 250 mPas |
| 30 | 1000 mPas | 300 mPas |
| 40 | 3000 mPas | 360 mPas |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a fiber-reinforced polyurethane composite article by vacuum infusion molding, comprising:

(a) degassing components comprising an isocyanate component and an isocyanate-reactive component, wherein:
  (1) the isocyanate component has a viscosity at 25° C. of from about 20 to about 300 mPas and comprises a diisocyanate or a polyisocyanate, and
  (2) the isocyanate-reactive component comprises:
    (i) one or more polyols having a viscosity at 25° C. of from 20 to 850 mPas, and an OH number of from about 200 to about 600,
    (ii) up to about 6% by weight, based on total isocyanate-reactive component, of a flow additive, and
    (iii) from about 2 to about 6% by weight, based on total isocyanate-reactive component, of a drying agent,
  with the sum of the weight percents for all of the components of the isocyanate-reactive component being equal to 100% by weight;
(b) combining the de-gassed components (1) and (2) to obtain a polyurethane-forming reaction mixture having a viscosity at 25° C. of less than 600 mPa·s for at least 30 minutes, a gel time at ambient temperature of greater than 60 minutes and a water content of less than 0.06% by weight, based on total system weight, wherein components (1) and (2) are combined in amounts such that the NCO Index is from 99 to 110 to form a polyurethane having sufficient green strength to be de-molded at ambient temperature in no greater than 6 hours;
(c) placing a fibrous reinforcing material in a vacuum chamber arranged to form a wind turbine blade;
(d) drawing down the pressure within the vacuum chamber to thereby push the reaction mixture into the vacuum chamber and into the fibrous reinforcing material; and
(e) curing the reaction mixture to form a composite of the fibrous reinforcing material infused with the cured reaction mixture that is in the form of a wind turbine blade.

2. The process of claim 1 in which the reaction mixture has a viscosity at 25° C. of less than 400 mPas.

3. The process of claim 1 in which the reaction mixture has a viscosity at 25° C. of from 250 to 300 mPas.

4. The process of claim 1 in which (2)(i) is a polyether polyol.

5. The process of claim 1 in which (2)(i) includes two or more polyether polyols.

6. The process of claim 1 in which the reaction mixture has a gel time of greater than 180 minutes.

7. The process of claim 1 in which the isocyanate component has a viscosity at 25° C. of less than 100 mPa·s.

8. The process of claim 1 in which the isocyanate component comprises diphenylmethane diisocyanate (MDI) or polymeric MDI.

9. The process of claim 1 in which (2)(i) has a viscosity at 25° C. of from 600 to 700 mPa·s.

10. The process of claim 1 in which (2)(i) includes a polyol having a viscosity at 25° C. of from 50 to 75 mPa·s.

11. The process of claim 1 in which the isocyanate-reactive component has an average functionality of from 2 to 3.

12. The process of claim 1 in which components (1) and (2) are reacted in amounts such that the NCO Index is approximately 1.02.

13. The process of claim 1 in which the fibrous reinforcing material comprises glass fibers, carbon fibers, aramid fibers and/or basalt fibers.

14. The process of claim 1, wherein the fiber-reinforced polyurethane composite article consists of fibrous reinforcing material infused with the cured reaction mixture.

15. The process of claim 1, wherein the composite comprises 30 to 80% by weight of reinforcing material, based on the total weight of the final composite.

16. The process of claim 15, wherein the composite comprises 50 to 72% by weight of reinforcing material, based on the total weight of the final composite.

* * * * *